UNITED STATES PATENT OFFICE.

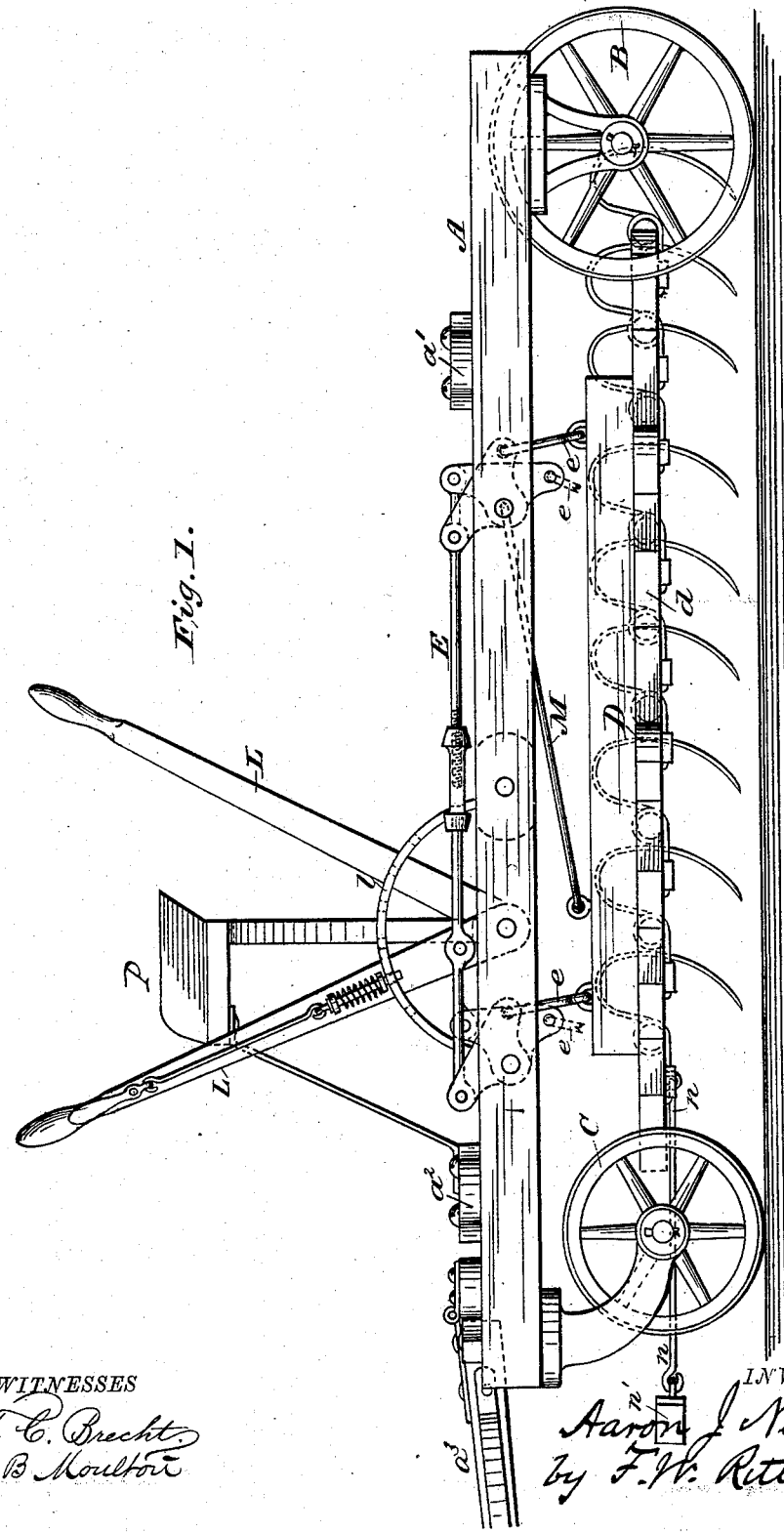

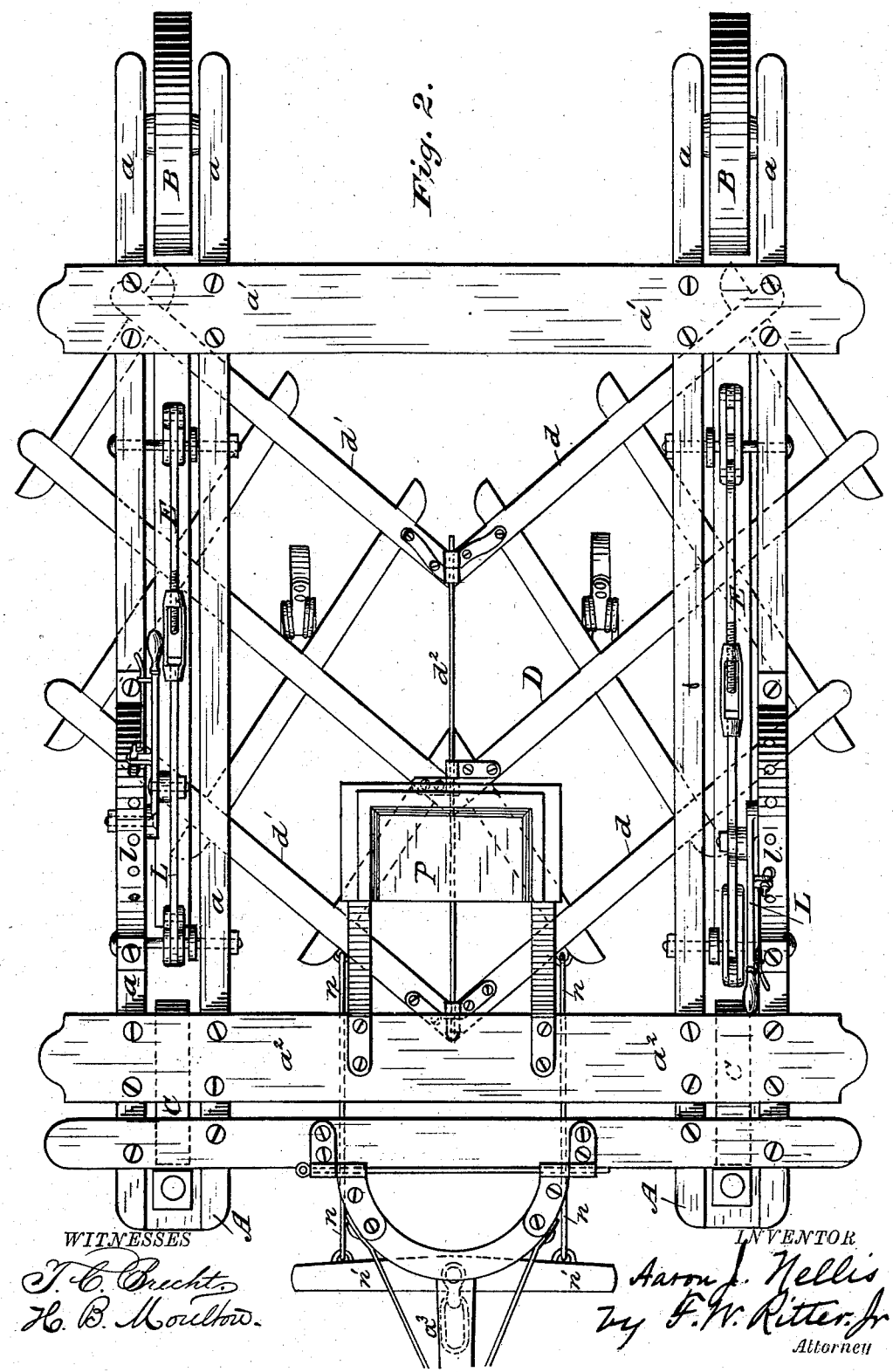

AARON J. NELLIS, OF PITTSBURG, PENNSYLVANIA.

MOUNTED HARROW.

SPECIFICATION forming part of Letters Patent No. 255,529, dated March 28, 1882.

Application filed October 31, 1881. (No model.)

*To all whom it may concern:*

Be it known that I, AARON J. NELLIS, a citizen of the United States, and a resident of Pittsburg, in the county of Allegheny and State of Pennsylvania, have invented certain new and useful Improvements in Mounted Harrows and like Implements; and I do hereby declare the following to be a full, clear, and exact description of the same, reference being had to the accompanying drawings, in which—

Figure 1 is a side elevation of devices embodying my invention. Fig. 2 is a plan or top view of the same.

Like letters refer to like parts wherever they occur.

My invention relates to the manner of suspending and of applying the draft to mounted harrows and like implements for farm use, driving-park harrowing, or like purposes.

The desirable points to be obtained in this class of implements, and therefore the objects of my invention, are, first, to so suspend the harrow from the carriage that it shall have a free movement independent thereof in all directions, so that the harrow is capable of a gyratory motion, whereby the draft is lightened, the depth of furrow equalized and rendered uniform, and the carriage relieved of the irregular motion commonly communicated thereto by the movements of the harrow; secondly, to so attach the draft to the mounted harrow as to facilitate the lift of the harrow, and thus enable it to readily pass all ordinary obstructions. To accomplish these objects I suspend the harrow between the wheels of the carriage entirely by loose links or equivalent connections which will permit the harrow to vibrate freely in all directions, attach the draft directly to the harrow, and move the carriage from the harrow through the medium of special draft or pull links, all as will hereinafter more fully appear.

I will now proceed to describe my invention more specifically, so that others skilled in the art to which it appertains may apply the same.

In the drawings, A indicates the carriage from which the harrow is suspended. This carriage may be of any suitable form and construction. It is provided at the rear with the wheels B, having the ordinary broad tread of wheels used for like purposes, and at the front with one or more swiveling guide-wheels, C. In the present instance what I deem the preferable form of carriage is shown—that is to say, the frame composed of two longitudinal bars, $a$, on each side, between which the rear wheels run and by which they are steadied, and to which the lifting and suspension devices of the harrow are pivoted. The longitudinal bars $a$ are connected by cross-bars $a'$ $a^2$, rendering the frame rigid, and to the forward cross-bar, $a^2$, a guide-tongue, $a^3$, may be pivoted to facilitate the turning of the carriage.

Instead of two swiveling guide-wheels placed at the corners of the carriage, the front of the carriage may have a single swiveling wheel arranged on the central line, if preferred.

D indicates the harrow suspended between the wheels, and which is preferably a double harrow or "butterfly," composed of two sections, $d$ $d'$, with cross-bar frames, pivoted together by the rod $d^2$. In the present instance it is shown as having spring-teeth and otherwise conforming to the harrow covered by my several patents, No. 234,321, of November 9, 1880, and No. 241,402, dated May 10, 1881; but the exact construction is immaterial, provided the harrow has longitudinal sections, or is what may be termed a "flexible" harrow. Each section is swung to or suspended from the longitudinal frame-bars of the corresponding side of the carriage by links $e$, or like connections which will permit the section to vibrate freely while still holding it down to its work; and in order to raise or lower the harrow to vary the depth of furrow the links $e$, instead of being connected directly to the bars $a$, are each connected to one arm of a bell-crank or elbow lever pivoted on the bars $a$, the opposite arms of said elbow-levers being connected together by a coupling-rod, E, provided with a hand-lever, L, and rack $l$, so that the elbow-levers may be simultaneously rocked or turned to elevate or depress both ends of the harrow uniformly and to lock it in the desired position. As in the case of long harrows—such as those used in preparing the roads of driving-parks—it is desirable to increase the range of adjustment of the harrow, I provide therefor by making the rod E, which couples the bell-cranks or elbow-levers, in two sections, with right and left hand threads, and connect the sections by an internally-threaded sleeve, making it what is often termed a "buckle-rod." By this means I can shorten or lengthen the coupling between the bell-cranks or elbow-levers, and thus increase or decrease the range of adjustment at will. As the loose links required to suspend the harrow and permit its lateral vibration would not act advantageously for draft purposes, I connect the harrow and carriage on each side by a pull-link or link-rod, M, pivoted on the carriage in rear of the transverse center of the harrow and to the harrow forward of its transverse center. This manner of connecting the two permits the elevation and depression of the harrow, and at the same time causes the carriage to take the power from the front of the harrow or near the point where the team is hitched.

n n indicate links or chains extending from the front of each harrow-section to a common draft-bar, n', to which the whiffletree may be attached, so that the draft is made directly on the harrow instead of through the intermediate carriage, as heretofore.

P indicates the driver's seat.

The operation of a mounted harrow constructed substantially as described will be as follows: The levers L having been moved to raise or lower the harrow and then locked to secure it at the desired height, and the team having been hitched to the harrow as specified, the sections of the harrow as the team moves forward will be free to vibrate laterally or gyrate independently of the carriage, and will thus accommodate themselves to any inequalities of the ground without communicating an irregular motion to the carriage. When unusual obstructions are met the section of the harrow corresponding thereto can be raised by its lever L without interfering with the work of the other section; and as the draft is directly on the harrow, which is linked from in front of its transverse center by the pivoted link-rod M, which extends to the rear of the carriage, the harrow, when not raised out of the way, will have a tendency to lift and ride over the obstruction rather than to plow under the same, as in former constructions.

I am aware that harrows have heretofore been suspended by loose or link connections, and like devices have been employed to elevate the harrow and to connect the same with the carriage, and hence I do not herein claim such constructions, broadly.

Having thus set forth the nature and advantages of my invention, what I claim, and desire to secure by Letters Patent, is—

1. The combination, with a carriage having front and rear wheels, of a sectional floating harrow arranged between the wheels thereof and suspended entirely by loose link-connections, whereby the harrow may vibrate in all directions independently of the carriage, draft-bars attached directly to the floating harrow, and an independent guide-tongue attached to the carriage above and independently of the draft-bar, substantially as and for the purpose specified.

2. The combination of a carriage and a flexible or sectional floating harrow arranged between the wheels thereof and suspended therefrom entirely by loose link-connections, and pull-links or link-rods, which extend from the harrow in front of its transverse center to points on the carriage in rear of the transverse center thereof, substantially as and for the purpose specified.

3. The combination, with the carriage and floating flexible harrow arranged between the wheels thereof and suspended by loose connections or links e, of the elbow-levers pivoted on the carriage, the buckle-rod E, for coupling the elbow-levers, and the pull-link or link-rods M, for transmitting power from the floating harrow to the carriage, the elements relatively arranged and adapted to operate substantially as and for the purpose specified.

In testimony whereof I affix my signature, in presence of two witnesses, this 15th day of September, 1881.

AARON J. NELLIS.

Witnesses:
F. W. RITTER, Jr.,
H. B. MOULTON.